United States Patent [19]

Hietala et al.

[11] Patent Number: 5,028,352

[45] Date of Patent: Jul. 2, 1991

[54] LOW DENSITY/LOW SURFACE AREA SILICA-ALUMINA COMPOSITION

[75] Inventors: Susan L. Hietala, Albuquerque; Douglas M. Smith, Corrales, both of N. Mex.

[73] Assignee: University of New Mexico, Albuquerque, N. Mex.

[21] Appl. No.: 378,747

[22] Filed: Jul. 11, 1989

[51] Int. Cl.$^5$ .............................................. B01J 13/00
[52] U.S. Cl. .................................. 252/315.6; 106/483; 501/12
[58] Field of Search ...................... 252/315.6; 106/483; 501/12; 502/235

[56] References Cited

U.S. PATENT DOCUMENTS

| | | | |
|---|---|---|---|
| 2,487,065 | 11/1949 | Milliken, Jr. | 252/315.6 X |
| 3,403,109 | 9/1968 | Colgan et al. | 252/315.6 X |
| 3,535,232 | 10/1970 | Lawrance et al. | 502/235 X |
| 4,266,978 | 5/1981 | Prochazka | 252/315.6 X |
| 4,310,441 | 1/1982 | Alafandi et al. | 502/235 |
| 4,432,798 | 2/1984 | Helferich et al. | 252/315.6 X |

FOREIGN PATENT DOCUMENTS

1193484  5/1965  Fed. Rep. of Germany ...... 502/235

OTHER PUBLICATIONS

Holm et al.: "Acidity Studies of Silica-Alumina Catalysts", The Journal of Physical Chemistry, vol. 63, No. 2, Feb. 18, 1959, pp. 129–133.

Fripiat et al.: "Structure and Properties of Amorphous Silicoaluminas, II, Lewis and Bronsted Acid Sites", *The Journal of Physical Chemistry*, vol. 69, No. 10, Oct. 1965, pp. 3274–3279.

S. Lowell.: *Introduction to Powder Surface Area*, John Wiley & Sons, New York, 1979, Chap. 19, "Density Measurement", pp. 175–181.

Rouxhet, P. G. and Sempels, R. E., "Hydrogen Bond Strengths and Acidities of Hydroxyl Groups on Silica-Alumina Surfaces and in Molecules in Solution", J. Chem. Soc. Faraday Trans., 2021–2032, (1974).

*Primary Examiner*—Richard D. Lovering
*Attorney, Agent, or Firm*—Albert Sopp

[57] ABSTRACT

A silica-alumina composition characterized by having an essentially closed pore surface as measurable by low surface area consisting essentially of a range of alumina by weight therein of from about 40% to about 50% and the remainder by weight, silica, the surface area of said composition being substantially less in magnitude than that for silica-alumina compositions having a percentage by weight of alumina essentially outside of said range, and further characterized by having a skeletal density for percentages of alumina by weight within a portion of said range substantially less than the skeletal density of silica-alumina compositions having a percentage by weight of alumina substantially outside said portion of said range.

6 Claims, 9 Drawing Sheets

FIG — 3
FIG — 4

FIG — 5
FIG — 6

FIG—10

LOW DENSITY/LOW SURFACE AREA SILICA-ALUMINA COMPOSITION

FIELD OF INVENTION

This invention relates generally to silica-alumina ceramic compositions and more particularly to a composition range and process which provides a silica-alumina xerogel having surface areas of up to and beyond about two orders of magnitude lower than for compositions outside the range and skeletal densities substantially lower than for compositions outside the range, thereby providing a lightweight silica-alumina material having an essentially nonporous surface and thus, highly advantageous as a coating.

BACKGROUND

Silica-alumina compositions have been tested or studied for various properties to determine the characteristics of such materials in several different contexts. One such study examined the properties of hydroxyl groups on mixed silica-alumina gels involving from 0% to 50% alumina by adsorbing weak H bond accepting molecules onto the gels and recording the OH stretching infrared band. This study revealed the unexpected result that superficial OH groups were not found to be more acidic than those on the silica gel although adsorbed ammonia or pyridine molecules are protonated by the surface. Rouxhet and Sempels,"Hydrogen Bond Strengths and Acidities of Hydroxyl Groups on Silica-Alumina Surfaces and in Molecules in Solution," Journal Chem. Soc. Faraday Transactions, 70, 2021-2032, [1974].

Another study reported by Fripiat, Leonard, and Utterhoeven in The Journal of Physical Chemistry, Vol. 69, No. 10, pp. 3274-3279, Oct., 1965, examined surface acid sites for silica-aluminas with compositions ranging from pure silica to pure alumina. Specifically, schematic structures derived previously from coordination number measurements and infrared spectroscopy had suggested different possible origins for Bronsted and Lewis acid sites according to both the hydration state and surface structure, thereby reflecting to some extent the organization in the bulk. One aspect of this study was the observance of a linear relationship in the variation of surface density in $NH_3$ irreversibly adsorbed by silica-alumina samples with varying proportions of alumina.

A study by Holm, Bailey, and Clark entitled "Acidity Studies of Silica-Alumina Catalysts" reported in the Journal of Physical Chemistry, Vol. 63, No. 2, pp 129-133, Feb. 1959, examined the relationship between acid content and catalytic properties for various compositions of silica-alumina. The results indicated a non-linear relationship in these aspects: The protonic acid content peaked where the composition was approximately 80% by weight of silica; the polymerization of propylene and hydrogen transfer peaked in the neighborhood of about 70% silica by weight.

Consequently, there is some basis in the prior art indicating a degree of non-linearity in certain observed characteristics of silica-alumina compositions as the ratio of silica to alumina is varied.

SUMMARY OF THE PRESENT INVENTION

The present invention provides a novel method and composition for silica-alumina which has an anomalously low surface area and density, and, consequently, which provides a low density ceramic material with an essentially non-porous surface ideally suited for use as an impervious coating with high resistance to heat, abrasion, and wear, important electrical and optical properties, and low permeability to moisture, gasses, and other intrusive substances. The method of preparation of the composition enables convenient application as a coating such as by dipping, spinning, or spraying.

BRIEF DESCRIPTION OF THE DRAWINGS

Reference is now made to the accompanying drawings in which:

FIGS. 3-6 are high resolution TEM micrographs of silica-alumina gels at respective alumina contents of 21%, 47%, 68%, and 75% by weight;

DETAILED DESCRIPTION OF THE INVENTION

In accordance with the present invention there is provided a composition of silica-alumina xerogel in which, in a rather narrow range of about 10 percentage points by weight—from about 40% by weight of alumina [$Al_2O_3$] to about 50% by weight of alumina—surrounding an optimal point at about 47% by weight of alumina, the surface area of the xerogel decreases beyond two orders of magnitude at about 47% by weight of alumina in comparison with the surface area of compositions of silica-alumina xerogels less than about 40% by weight of alumina and greater than about 50% by weight of alumina. This is shown in the graph of FIG. 1, a plot of percentage of alumina by weight in silica-alumina versus the surface area in square meters per gram for a range of values by weight of the alumina extending from about 20% to about 75%.

Figure 1:
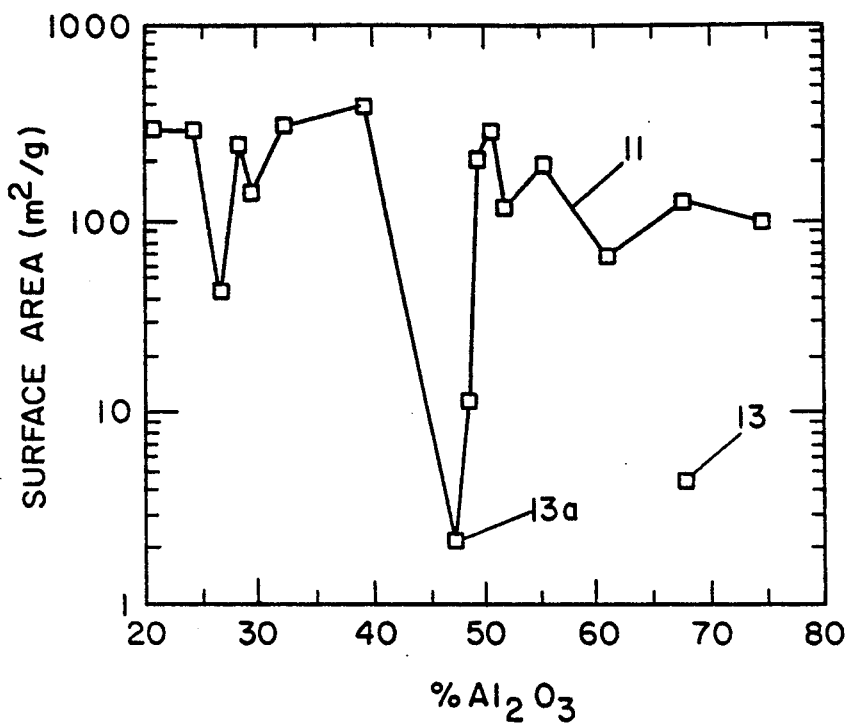
FIG. 1 is a graph indicating the nitrogen surface area as a function of the alumina content of silica-alumina compositions in accordance with the invention.

As indicated in FIG. 1, a curve 11 connecting the data points 13 has a sharp dip beginning at about 40% by weight of alumina down to a point 13a where the percentage by weight of the alumina in the silica-alumina gel is approximately 47%. At point 13a it is seen that the surface area is substantially over one one-hundredth less than that for percentages of alumina below about 40% and greater than about 50%.

Figure 2:
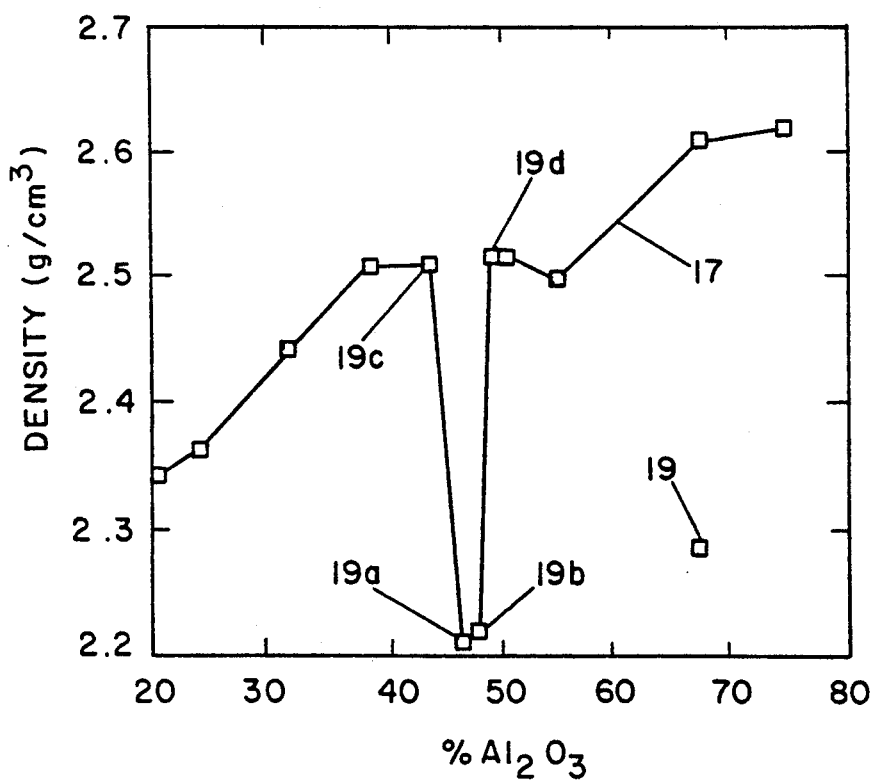
FIG. 2 is a graph indicating the density of silica-alumina compositions according to the invention as a function of the alumina content thereof.

Referring to FIG. 2 which is a plot of percentage by weight of alumina in silica-alumina versus density in grams per cubic centimeter, it is seen from the curve 17 connecting data points 19 that at an optimum of about 47% by weight of alumina [at adjacent data points 19a and 19b] the skeletal density of the silica-alumina composition begins a sharp decrease beginning at data point 19c [corresponding to a percentage by weight of alumina of about 45%] to a minimum at points 19a and 19b and increasing until it reaches data point 19d [corresponding to a percentage by weight of alumina of about 50%]. This skeletal density is significantly lower than for percentages by weight of alumina outside the range of about 45% to about 50%. That is, as seen from the graph of FIG. 2, the drop in skeletal density of the composition occurs between about 45% and about 50% by weight of alumina, with the point of minimum density being at about 47% by weight of alumina.

The silica-alumina xerogel composition comprised of about 47% by weight of alumina was made by a process in accordance with the invention in a manner to be described hereinbelow. In analyzing the resulting composition to determine surface area or surface porosity [e.g., the extent to which the surface is characterized by having a closed porosity] and the skeletal density as well as other aspects, the procedure set forth below was followed.

Elemental analysis was determined using a Rigaku x-ray fluorescence spectrometer [rhodium target with end window, 50 kv, 45 ma]. Phase analysis was conducted using a Scintag powder x-ray diffractometer. Nitrogen adsorption at 77K was measured for 5 relative pressures in the range of 0.05 to 0.30 using an Autosorb-1 adsorption analyzer. Surface areas were calculated using the BET equation and a molecular cross sectional area of 0.162 nm$^2$. Before analysis samples were outgassed at approximately 383K under vacuum for about 3 hours. Pore volume was estimated from the nitrogen uptake at $P/P_o$=app. 0.99. True density was measured via helium displacement at about 298 K using a Quantachrome micropycnometer. Transmission infrared was conducted using KBr pellets and a Perkin Elmer 683 spectrometer.

The morphology of the material was examined using a JEOL JEM-2000FX side-entry transmission electron microscope [TEM] at an accelerating voltage of 200 kv. This instrument was also fitted with a Tracor Northern TN 6600 energy dispersive spectrometer [EDS] system for x-ray analysis. Samples were prepared by sprinkling powder particles onto copper grids coated with a thin carbon film.

During gel drying the pore structure was probed by low field NMR spin lattice relaxation measurements of the pore fluid. In this procedure, the spin lattice relaxation time of a fluid contained in a pore, $T_1$, is a function of the pore size [e.g., for smaller pore sizes, a fluid will relax faster]. As explained and described by Glaves, Brinker, Smith, and Davis in their article "In Situ Pore Structure Studies of Xerogel Drying", Chemistry of Materials, 1, 34, [1989], this approach has been used to measure changes in both total surface area and pore size distribution during the drying of aged, base catalyzed silica gels. If relaxation behavior is exponential, i.e., a fairly narrow, unimodal pore size distribution, the calculated average $T_1$, $T_{1ave}$, is related to the $T_1$ of the bulk fluid, $T_{1b}$, the surface area of the gel, $A_s$, the mass of the solid sample per volume of pore fluid, $M_v$, and the surface relaxation time, $T_{1s}$, by:

$$1/T_{1ave} = 1/T_{1b} + M_v A_s / T_{1s} \quad (1)$$

During drying, $T_{1ave}$ is determined at different pore fluid contents. If the surface areas $A_s$ is constant, a plot of $1/T_{1ave} - 1/T_{1b}$ versus $M_v$ [determined gravimetrically] should be linear. Three gels at respective percentages by weight of alumina of 35, 47, and 55 were cast in 25 mm NMR tubes and allowed to dry slowly at 303K. M(tau) was measured using a 90 degree-tau-90 degree pulse sequence with 32 tau points spaced at every 100 ms [every 75 ms for some samples with shorter $T_{1s}$]. Measurements were made at proton frequency of 10 MHz using a Praxis pulse spectrometer. The distribution of pore volume with $T_1$ was found using a non negative least squares [NNLS] algorithm described by Munn and Smith in their article "A NMR Technique for the Analysis of Pore Structure: Numerical Inversion of Relaxation Measurements", Journal Colloid Interface Science, 119, 117, [1987]. The average $T_1$ was found using the method described by Glaves, et al. in the article referred to above.

Samples of the dried powders were loosely packed in 1 mm path length cells for analysis by small angle scattering. Compositions of 47% and 68% alumina were studied. Small angle x-ray scattering [SAXS] was performed using 1.54 Angstroms slit collimated illumination from a Kratky system, and a small angle neutron scattering [SANS] was performed in a reactor using 4.75 Angstroms point collimated neutrons. The SAXS data were desmeared to remove the effects of slit collimation so that the SAXS and SANS data could be directly compared. The scattered intensity I(q) at a given scattering wave vector q [q=(pi/lambda) sin (theta/2), with lambda being the wavelength and theta the scattering angle] reflects the scattering density fluctuations in the sample with the wave vector q, expressed as follows:

$$I(q) = \frac{\epsilon}{\eta} g(r) \frac{\sin}{qr} (qr) 4\pi r^2 dr \quad (2)$$

where g(r) is the correlation function of density fluctuations.

Additional techniques such as NMR can be and were employed to obtain data on the nature of the compositions, particularly element specific information regardless of homogeniety or degree of crystallinity. Such techniques have been described for aluminas by John, Alma, and Hayes in an article entitled "Characterization of Transition Alumina by Solid State Magic Angle Spinning Aluminum NMR", Appl. Catal., 6, 341 [1983] and by Covino and Nissan in "Synthesis and Characterization of Aluminum Pioronate Sol-Gel Derived Al$_2$O$_3$", Mat. Res. Bull., 21, 377-44 [1986]; for silicates by Lippmaa, Magi, Samosan, Englehardt, and Grimmer in "Structural Studies of Silicates by High Resolution $^{29}$Si NMR", J. Am. Chem. Soc. 102, 4889, [1980], by Sherriff and Grundy in "Calculations of 2991 MAS NMR Chemical Shifts from Silicate Mineral Structure" Nature, 332, 819-22 [1988], and Smith and Blackwell in "Nuclear Magnetic Resonance of Silica Polymorphs", Nature, 303, 223-25 [1983], and for aluminosilicates by Lippmaa, Magi, Samosan, Tarmak, and Englehardt in "Investigation of the Structure of Zeolites by High Resolution NMR Spectroscopy", J. Am. Chem. Soc., 103, 4992-96 [1981], by Murdoch, Stebbins, and Carmichael in "High Resolution $^{29}Si$ NMR Study of Silicate and Aluminosilicate Glasses. The Effect of Network-Modifying Cations," Am. Minerol., 66. 678-70 [1985], and Khomarneni, Roy, Fyfe, Kennedy, and Strobl in "Solid State $^{27}Al$ and $^{29}Si$ Ceram. Soc., 69, C-42-44 [1986].

Natural abundance $Si_{29}$ and $Al_{27}$ MAS-NMR spectra were acquired using a GE GN-300 wide bore instrument equipped with Chemagnetics solids accessories and a 7.05 T cryomagnet operating a proton resonance frequency of 300.1 MHz. The rotation angle was adjusted using the Br-79 resonance of KBr. $Si_{29}$ spectra were acquired at 59.6 MHz using 45 degree [3.25 microsec] single pulse excitation and high power decoupling gated on during the acquisition time. A recycle time of 90 seconds was employed to ensure quantitative analysis. Samples were contained in Kel-F rotors and spun at 3 KHz. $Si_{29}$ chemical shifts were referenced to TMS. $Al_{27}$ spectra were acquired at 78.2 MHz using 1 microsec pulses and 1 second recycle delays. Samples were placed in Torlon rotors and spun at rotation rates of up to 8 KHz. Proton decoupling was not employed, owing to the negligible contribution of dipolar broadening to the linewidths observed. $Al_{27}$ chemical shifts were referenced to aqueous $Al(H_2O)_6$.

Four samples of silica-alumina were prepared with compositions of 21%, 47%, 68%, and 75% by weight alumina [dry basis] as determined by x-ray fluorescence [XRF]. X-ray diffraction [XRD] analysis indicated that all four samples were amorphous. For the low field NMR experiments, samples at 35%, 47%, and 55% alumina by weight were synthesized as both powders and monoliths. In carrying out the testing, as was mentioned earlier, the nitrogen surface area as a function of the alumina content of the samples was observed to have a large drop—about two orders of magnitude—in the region 47% by weight of alumina. Also, as mentioned before, true density measurements of the samples showed for the sample containing the region 47% by weight of alumina a significant drop in skeletal density.

High resolution TEM micrographs of the 21%, 47%, 68%, and 75% samples are shown in FIGS. 3-6 respectively. For the 21%, the structure shown in FIG. 3 is seen to be similar to that of base catalyzed silica gels discussed by Brinker, Drotning, and Scherer in "A Comparison Between the Densification Kinetics of Colloidal and Polymeric Silica Gels", Better Ceramics Through Chemistry I, 25-32, Editors Brinker, Clark, Ulrich, Materials Research Policy, Pittsburgh, PA [1984]. This structure is characterized with globular primary particles of diameter about 10 nm. For the highest alumina samples—68% and 75%—shown in FIGS. 5 and 6, these gels also have features on length scales less than 20 nm but are not as distinct as for the 21% sample. In distinct contrast to the samples in FIGS. 3, 5, and 6, the micrograph of the 47% sample shown in FIG. 4 indicates no regular features at these small spatial scales—around 20 nm or less.

Figure 7:
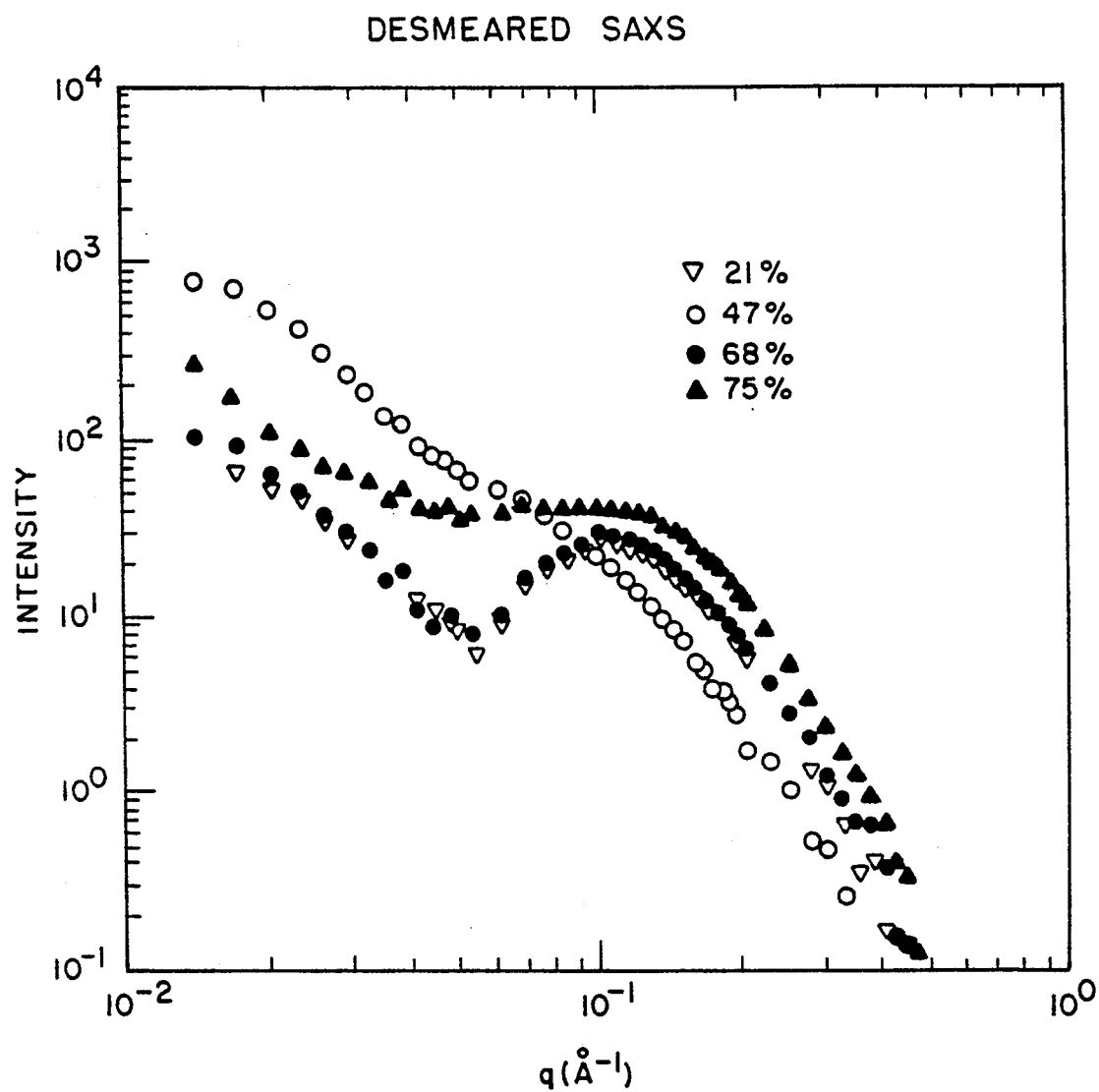
FIG. 7 is a graph showing small angle x-ray scattering ["SAXS"] of the alumina-silica system over a range of compositions where the alumina content is 21%, 47%, 68%, and 75% by weight.

Small angle x-ray scattering [SAXS] of the alumina-silica system over a range of compositions is shown in FIG. 7. The data were desmeared to remove the effects of slit collimation. The 21%, 68%, and 75% samples each exhibit a peak near the point $1/q=1.0$ nm, indicating that those samples have small pores of that diameter. However, in comparison, the 47% sample has no peak and exhibits large scattering intensities at small q, suggesting the presence of large pores not accessible through SAXS measurements.

Figure 8:
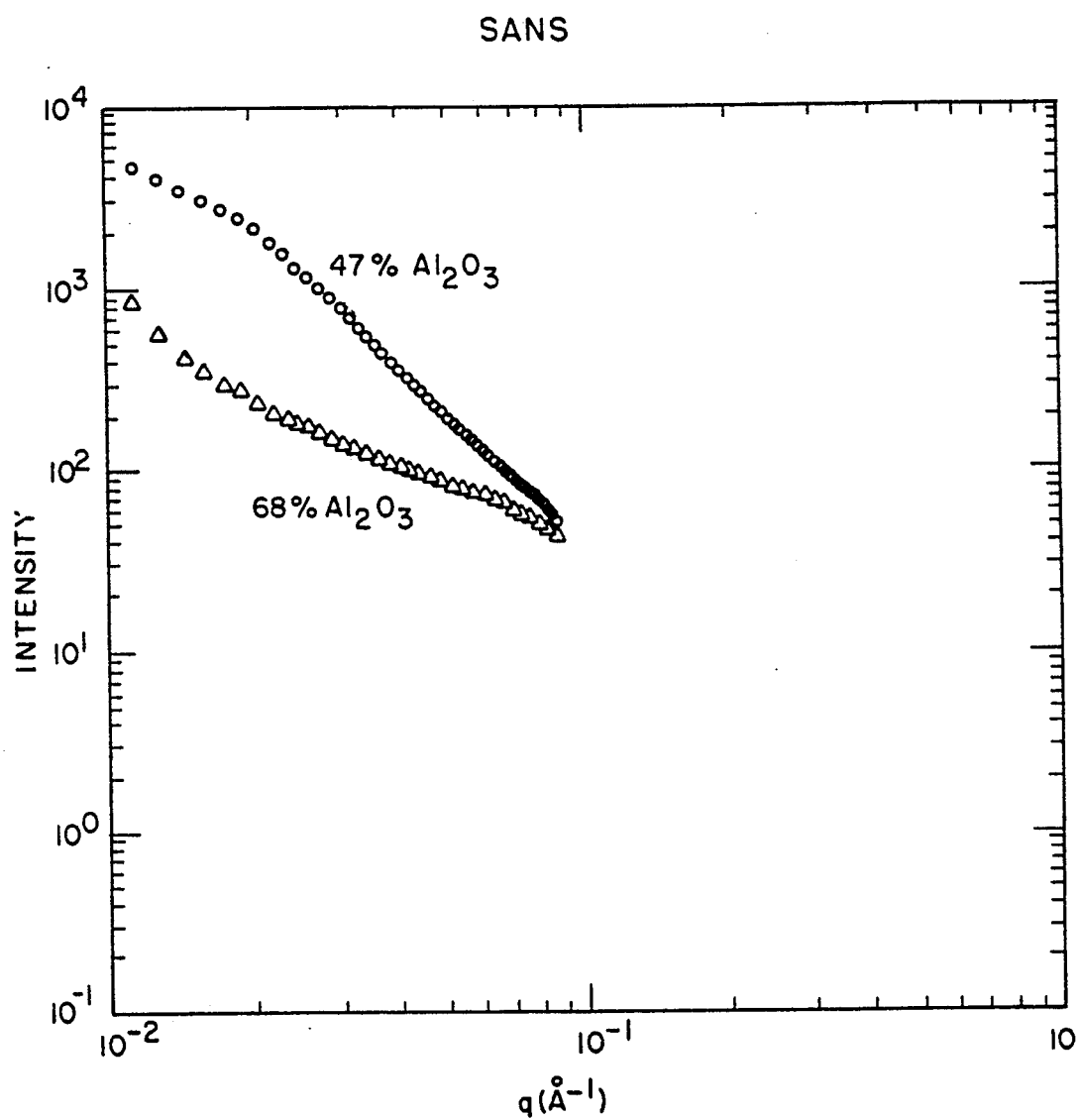
FIG. 8 is a graph indicating small angle neutron scattering ["SANS"] of 2 compositions of the alumina-silica system at 47% and 68% by weight of alumina.

Small angle neutron scattering [SANS] of the 47% and 68% samples is shown in FIG. 8. Because the SANS data covers smaller values of q, the sample has larger lengths. The 47% sample is seen to have a scattering intensity bulge or shoulder near the value $1/q=5.0$ nm, indicative of pores of that size. In contrast, the 68% sample has no such feature in the covered q range. Consequently, this tends to verify that the 47% sample has large scale density fluctuations with closed pores on the surface, or at least a surface having a very substantial percentage of closed pores, as indicated by the intensity bulge or hump around $q=0.2$ nm.

For the gel and fluid contents studied, unimodal $T_1$ distributions were found. During the drying process in producing the sample [described below], the gel shrinks until the matrix stiffens sufficiently such that upon further evaporation, the fluid vapor meniscus penetrates the matrix. During this drying step, $M_v$ was observed to have increased by a factor of 2, indicating that the pore volume had decreased by a factor of 2.

Figure 9:
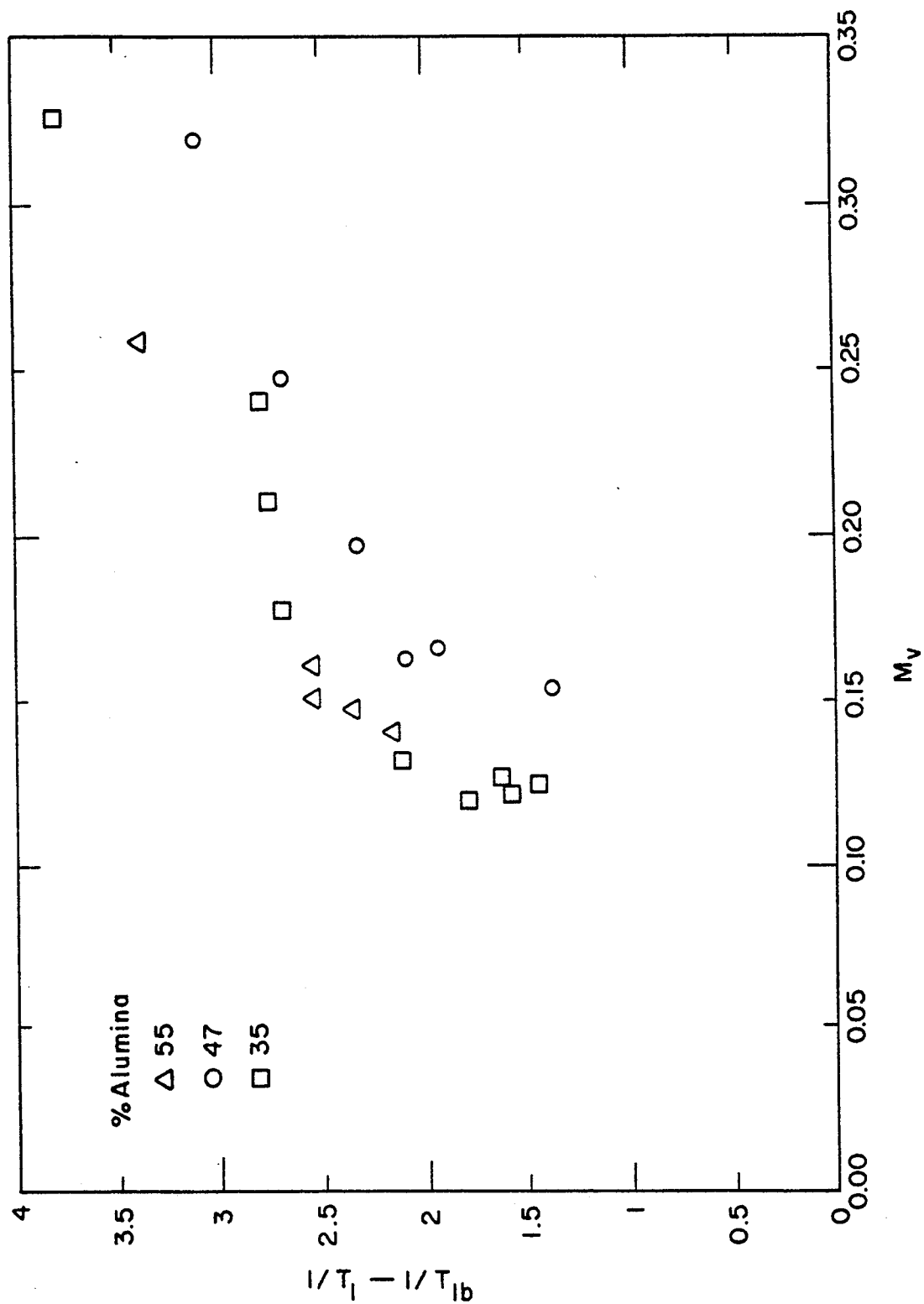
FIG. 9 is a graph indicating pore structure of gel compositions of silica-alumina through NMR observations for alumina contents of 35%, 47%, and 55% by weight.

NMR studies were made of the initial pore structure of the gels. Referring to FIG. 9, a plot in accordance with equation (1) above of $1/T_{1ave} - 1/T_{1b}$ versus $M_v$ related to the fluid content should be linear for a constant surface area and extrapolate through the origin. The plots in FIG. 9 for the 35%, 47% and 55% gels show this to be substantially the case, indicating no substantial difference in porosity of the various samples during the initial drying process. Otherwise the 47% gel would have had a $1/T_{1ave} - 1/T_{1b}$ value of about zero for the range studied. Thus, the closed porosity/low surface area occurs at a later stage of the drying process.

Figure 10:
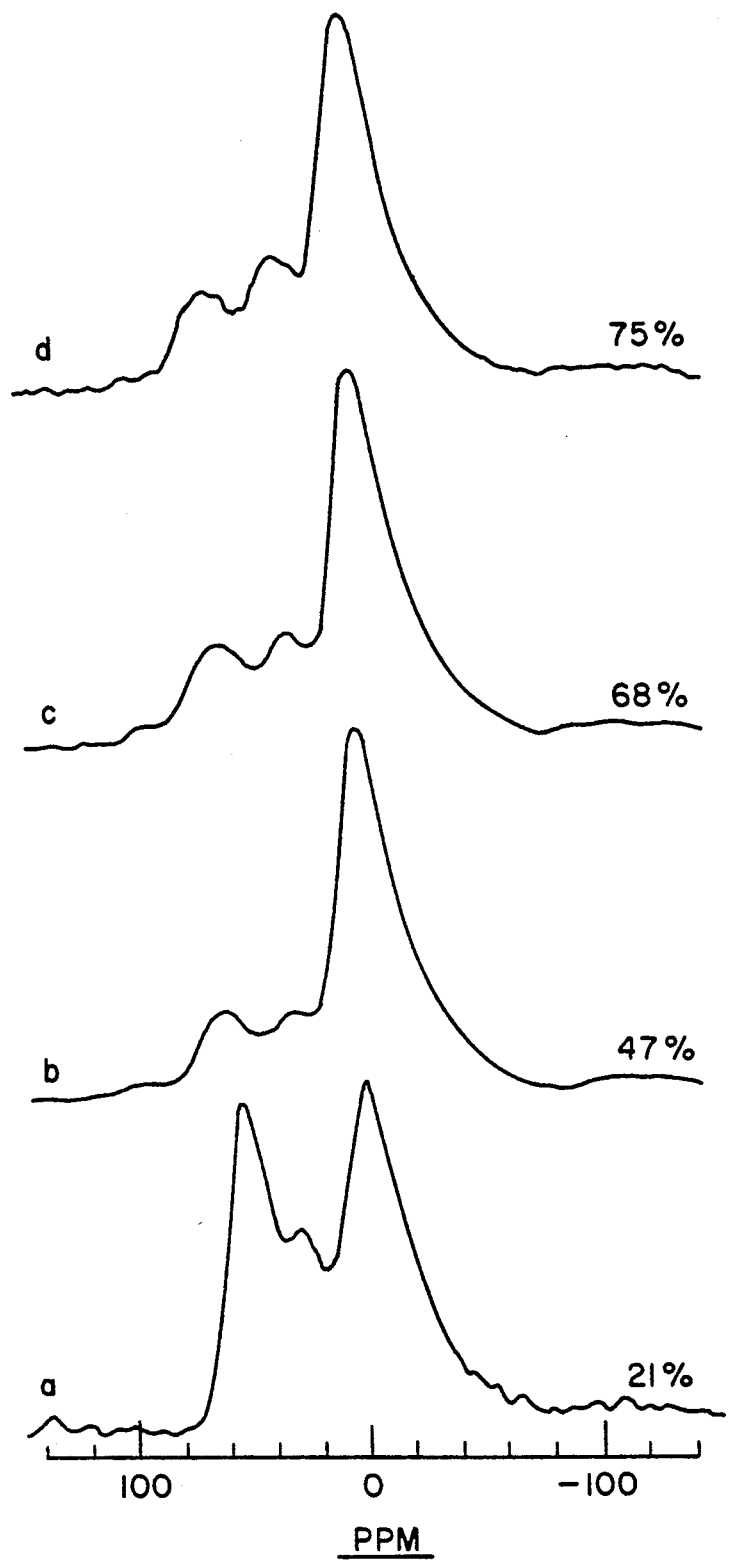
FIG. 10 with graphs [a] through [d] are Magic Angle Spinning [MAS] NMR spectra of the aluminosilicate xerogels as a function of the ratio of alumina to silica in the compositions.

The curves [a] through [d] in FIG. 10 show the results of $Al_{27}$ MAS-NMR spectra for the aluminosilicate xerogels as a function of the $Al_2O_3/SiO_2$ ratio at 21%, 47%, 68%, and 75%. All spectra clearly indicate three resonances, those at 58 and 0 ppm being indicative of tetrahedral and octahedral coordinated aluminum, respectively. The third resonance at about 29 ppm is consistent with the chemical shift of 5 coordinated aluminum, as shown previously by Alemany and Kirker in "First Observation of 5-Coordinate Aluminum by MAS $^{27}Al$ NMR in Well-Characterized Solids", J. Am. Chem. Soc., 108, 6158-62 [1986] and by Irwin, Holmgren, and Jones in "$^{27}Al$ and $^{29}Si$ NMR Study of Sol-Gel Derived Aluminosilicates and Sodium Aluminosilicates", J. Mater. Sci., 23, 2908 [1988]. The large relative area of the resonance at 58 ppm is consistent with significant amounts of aluminum at tetrahedral silica framework sites. The relative intensity of this resonance decreases noticeably as the ratio of alumina to silica is increased to 47%. The relative intensities of the resonances above the 47% ratio of alumina to silica do not change much, suggesting that a stepwise change in aluminum coordination occurs between 21% and 47% since gradual changes in speciation are involved. All of the spectra in FIG. 10 exhibit similar line widths indicating the same short range order for these xerogels.

Figure 11:
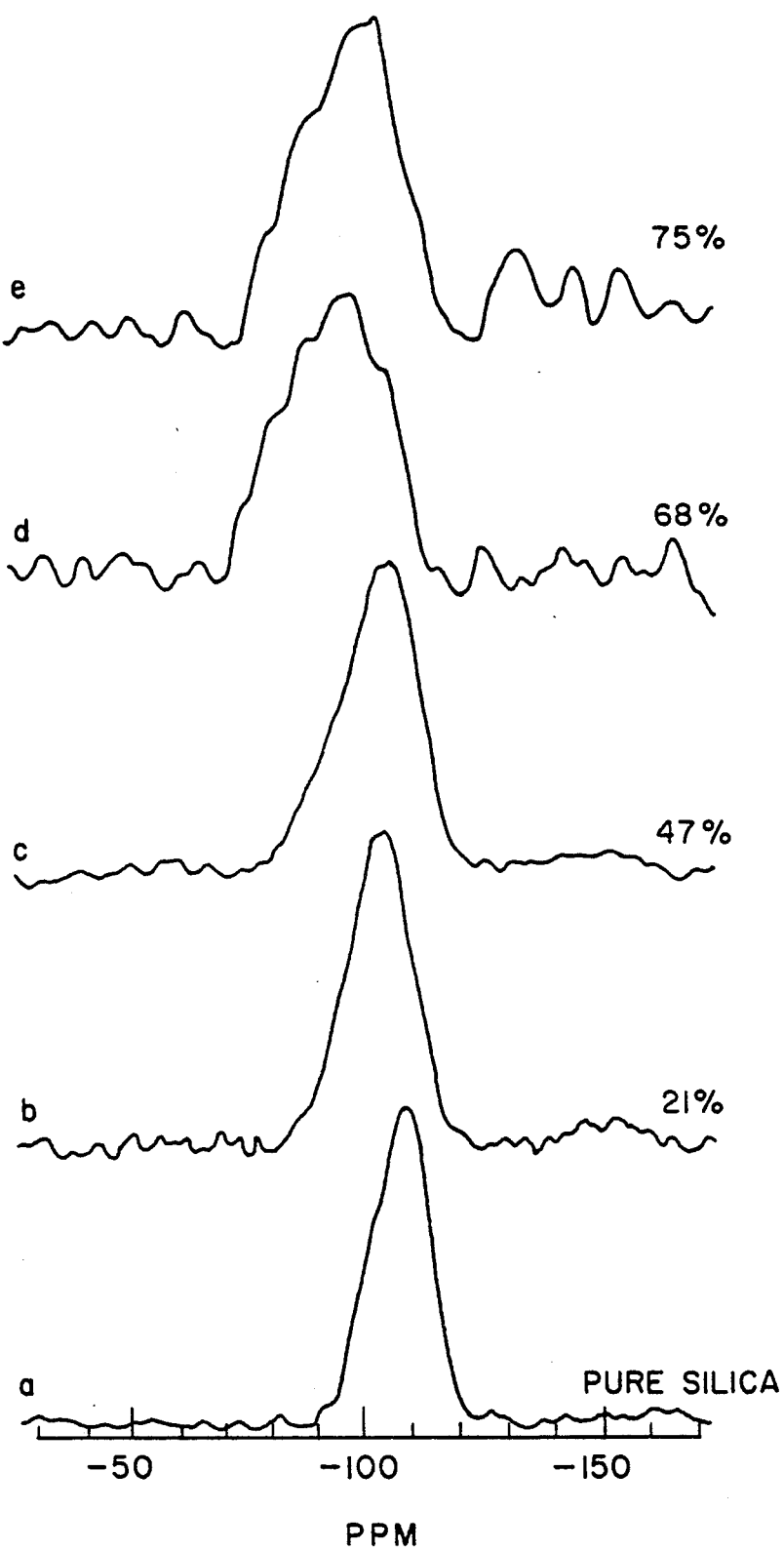
FIG. 11 has a graph [a] indicating the $Si_{29}$ spectrum of silica gel as a reference and graphs [b] through [e] indicating the $Si_{29}$ spectra of aluminosilicate xerogels as a function of the ratio of alumina to silica.

The $Si_{29}$ spectra of the aluminosilicate xerogels are shown in curves [b] through [e] of FIG. 11 for comparison with the curve [a] which is an $Si_{29}$ spectrum for silica gel. All of the spectra show one broad resonance, denoting a lack of crystallinity and indicating the presence of a wide range of silicon species. Lack of resolution precludes analysis of silicon speciation. The xerogel resonances broaden and shift slightly downfield from 105 to 98 ppm as the ratio of alumina to silica increases. The increase in linewidth indicates that a wider range of silicon species exists at increasing alumina concentrations. The downfield shift with increasing concentrations is consistent with downfield shifts of $Si_{29}$ resonances corresponding to aluminum substitution into the $Si_{29}$ second coordination sphere as reported in 1983 by John, Alma and Hayes in the article cited previously herein. The observed chemical shift for the samples with high alumina concentrations [−98 ppm] suggests that not all of the aluminum is incorporated into the oxide network and exists as extra framework Al-O-Al. This is consistent with the $Al_{27}$ data discussed above.

Figure 12:
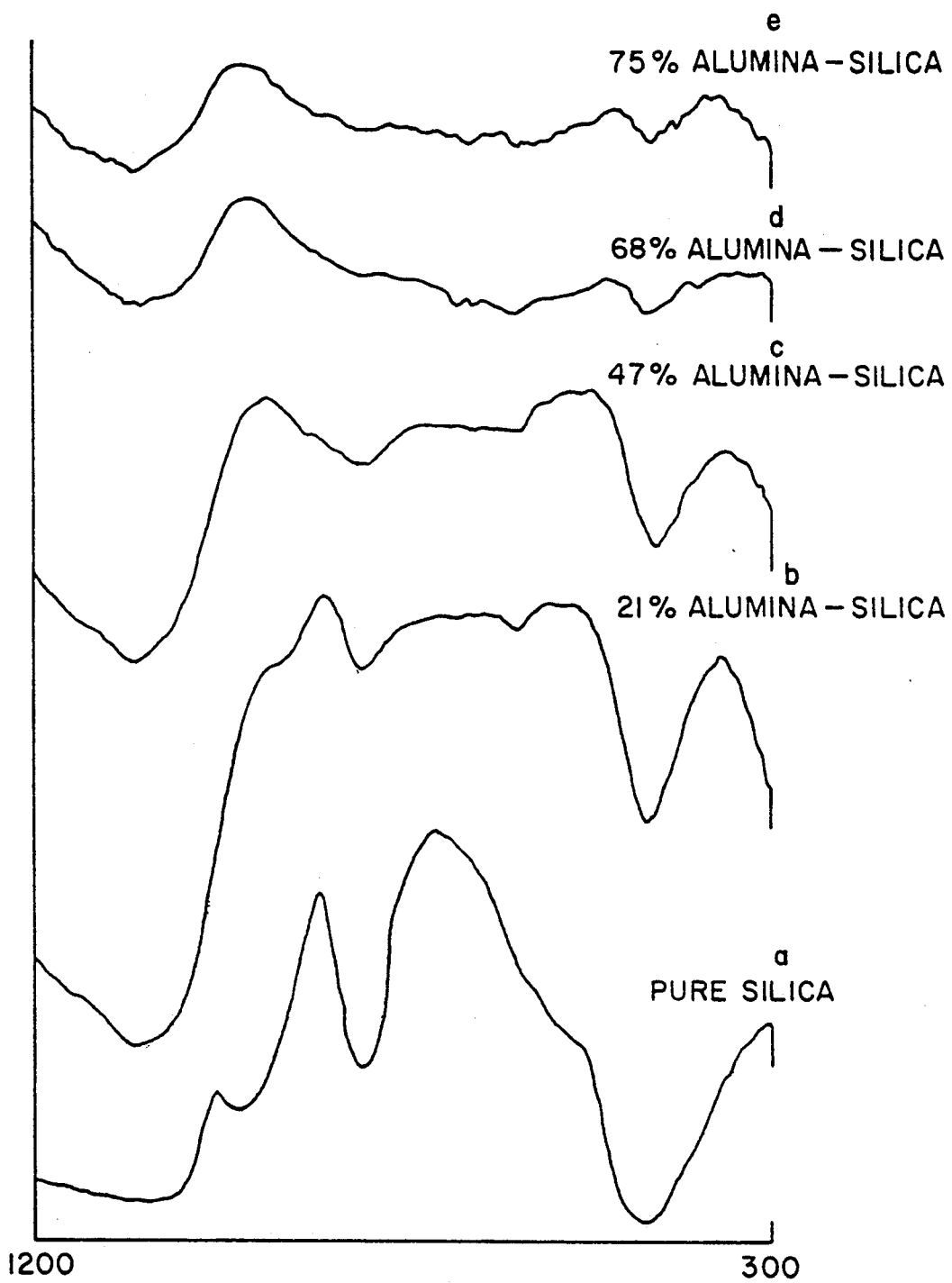
FIG. 12 with graphs [a] through [e] indicate in [a] the infrared spectra for silica xerogel and in [b] through [e] the infrared spectra for aluminosilicate xerogels.

Infrared spectra for the silica xerogel and the aluminosilicate xerogels are shown in FIG. 12 in respective curves [a] through [e]. It is seen that as the alumina content increases, a decrease in the Si-OH absorption at 950 cm-1 and a gradual increase in the Al-O-Al absorption between 700 and 800 cm-1 are noted. The transitions with increasing alumina content are gradual and per se indicate no anomalous behavior for the 47% sample.

In accordance with an embodiment of the invention, the silica-alumina composition consisting essentially of 47% by weight of alumina is synthesized as follows:

Example:

A silica-alumina sol was prepared by the steps of: [a] mixing equal parts by volume of Fisher reagent grade tetraethyl orthosilicate [TEOS] and Midwest Grain Products 200 proof ethyl alchohol [ethanol] in a round bottom flask, [b] adding 0.17 parts by volume of concentrated HCl in 0.32 parts by volume of ethanol to solution, [c] adding aluminum tri(sec)butoxide ("ASB") [Aldrich Chemical Co., Inc.] to the solution in the flask, [d] adding 24× [by volume of ASB] ethanol to solution to obtain the appropriate dilution, [e] adding ethanol to obtain the appropriate dilution, e.g., about 2 weight percent solids, and [f] refluxing the solution overnight, e.g., for about 16 hours at about 353K or at that temperature until there is substantially no particulate matter in the solution which is visible to the naked eye. The gel was then formed by [g] adding water to the solution in molar ratios of at least approximately 100 $H_2O$:1 Si and drying the gel at about 383K overnight or about 8 hours.

In accordance with an embodiment of the invention in which approximately 6.5 g of composition in the form of a xerogel was produced, the following specific materials were used to produce silica-alumina [2.0 wt% or 1.3 mol% solids] with 47% by weight alumina as follows:

[1] 12.3 ml (0.0551 mol). . . TEOS;
[2] 12.3 ml (0.21 mol). . . Ethanol;
[3] 2.1 ml (0.068 mol). . . HCl;
[4] 4.0 ml (0.0685 mol). . . Ethanol;
[5] 14.2 g (0.0576 mol). . . Aluminum tri(sec) butoxide;
[6] 340 ml (5.825 mol). . . Ethanol;
[7] 9.93 ml (0.55 mol). . . Water (water to Si ratio equals approximate minimum of 100).

This procedure provides advantageous control of the hydrolysis conditions so that the rate at which the TEOS and the aluminum tri(sec)butoxide are hydrolized enables generation of the desired low surface area of the composition.

In particular, concomitant with the control of hydrolysis conditions is control of pore fluid surface tension. The surface area of the dried gel is related to the surface tension of the pore fluid as it evaporates, i.e., as it is removed during the drying stage.

While several embodiments of the present invention have been described herein, it is understood that various changes can be made in the form, details, arrangement, and other aspects of the embodiments of the invention without departing from the spirit and scope of the invention as defined by the appended claims.

What is claimed is:

1. A silica-alumina composition characterized by having an essentially closed pore surface as measurable by low surface area consisting essentially of a range of alumina by weight therein of from about 40% to about 50% and the remainder by weight, silica, the surface area of said composition being substantially less in magnitude than that for the silica-alumina compositions having a percentage by weight of alumina essentially outside of said range, the approximate maximum extent to which the surface area of said composition is less than the surface area for silica-alumina compositions outside of said range occurring at approximately 47% by weight of alumina.

2. The silica-alumina composition of claim 1 wherein said maximum extent is at least two orders of magnitude.

3. The silica-alumina composition of claim 1 wherein the composition is a xerogel.

4. The silica-alumina composition of claim 1 further characterized by having a skeletal density for percentages of alumina by weight within a portion of said range substantially less than the skeletal density of silica-alumina compositions having a percentage by weight of alumina substantially outside said portion of said range.

5. The silica-alumina composition of claim 4 wherein said portion of said range is from about 45% by weight of alumina to about 50% by weight of alumina.

6. The method of preparing a silica-alumina composition in the form of a xerogel in which the percentage of alumina is from about 40% by weight to about 50% by weight of comprising the steps of:

mixing essentially equal parts of tetraethyl orthosilicate and ethanol to provide a solution;

adding about 0.17 parts HCl in about 0.32 parts ethanol to the solution;

adding aluminum tri(sec)butoxide to the extent of within plus or minus of approximately 25% of tetraethyl orthosilicate necessary to make a composition of approximately 47 wt% alumina;

adding about 24× by volume of said aluminum tri(sec)butoxide of ethanol to the solution resulting in a mixture;

refluxing the resulting mixture;

adding water as necessary to produce a gel from said mixture, and letting the water evaporate to thereby form an amorphous solid or xerogel.

* * * * *